United States Patent
Rivat et al.

(10) Patent No.: US 6,849,143 B2
(45) Date of Patent: Feb. 1, 2005

(54) METHOD FOR THE PRODUCING OF A FLOOR COVERING

(75) Inventors: Alain Rivat, Amplepluis (FR); Robert Hinault, Marcilly d' Azergues (FR)

(73) Assignee: Gerflor, Villeurbanne (FR)

( * ) Notice: Subject to any disclaimer, the term of this patent is extended or adjusted under 35 U.S.C. 154(b) by 0 days.

(21) Appl. No.: 10/639,416

(22) Filed: Aug. 12, 2003

(65) Prior Publication Data

US 2004/0045664 A1 Mar. 11, 2004

Related U.S. Application Data

(63) Continuation of application No. PCT/FR01/00559, filed on Feb. 27, 2001.

(51) Int. Cl.[7] .................. E04F 15/16; B32B 31/12; C09J 175/04; C09K 3/10; C08G 18/48
(52) U.S. Cl. .................. 156/71; 156/281; 156/295; 156/304.1; 156/307.3; 156/331.7; 52/741.4; 52/746.1; 52/747.11
(58) Field of Search .................. 156/71, 157, 281, 156/295, 34.1, 307.3, 331, 304.1, 331.7; 52/578, 741.4, 745.05, 745.21, 746.1, 747.11, 389, 390, 391–392, 581

(56) References Cited

U.S. PATENT DOCUMENTS 2,018,711 A * 10/1935 Elmendorf .................. 52/396.1
3,827,204 A 8/1974 Walters
5,250,145 A * 10/1993 Despins et al. ............. 156/578
5,547,741 A * 8/1996 Wilson ........................ 428/215
5,564,598 A 10/1996 Camm et al.
5,721,302 A * 2/1998 Wood et al. ................. 524/271
5,951,796 A * 9/1999 Murray ........................ 156/78

FOREIGN PATENT DOCUMENTS

| DE | 949 261 | 9/1956 |
|---|---|---|
| DE | 297 10 453 | 10/1997 |
| FR | 2 428 119 | 1/1980 |
| FR | 2 681 884 | 4/1993 |
| FR | 2 804 456 | 8/2001 |
| JP | 07-268309 | 10/1995 |
| JP | 08-104861 | 4/1996 |

* cited by examiner

Primary Examiner—Christopher A. Fiorilla
Assistant Examiner—Sing P Chan
(74) Attorney, Agent, or Firm—Burr & Brown

(57) ABSTRACT

The invention relates to a method for laying a floor covering that includes a flexible material containing a thermoplastic wear layer made from, in particular, plasticized PVC. The basic panels that form the covering are glued to the ground and cold welded in between on the site to be covered. After a panel has been positioned and glued to the surface to be covered, a continuous bead of mastic, which is made on the actual site by mixing a hardener and a polyurethane resin in aqueous phase, is applied laterally along the entire depth of the covering. The next panel is positioned on the ground which is covered with adhesive and the lateral edge thereof is pinned against the edge of the preceding panel comprising the bead of mastic, thereby causing the excess material to come to the surface, where it is removed by simply wiping with water.

8 Claims, 2 Drawing Sheets

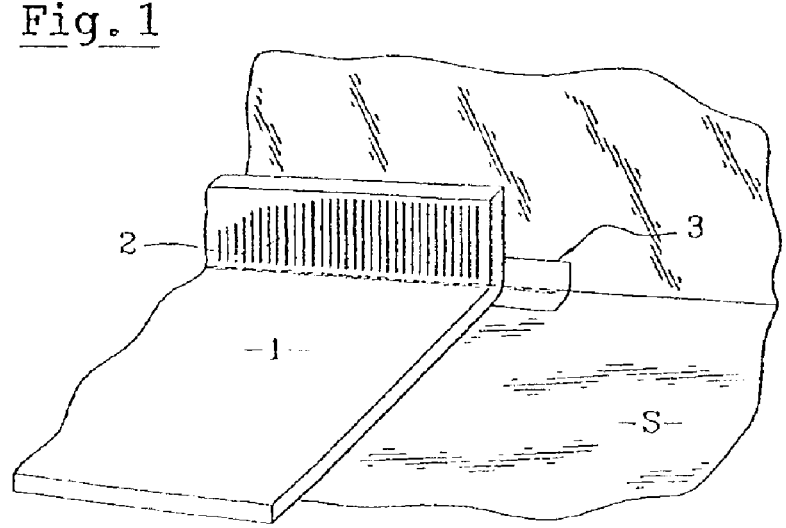
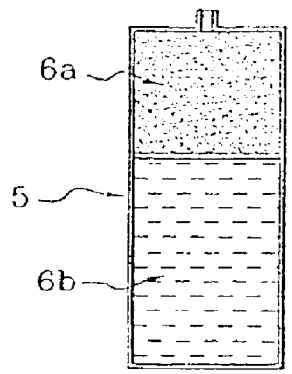 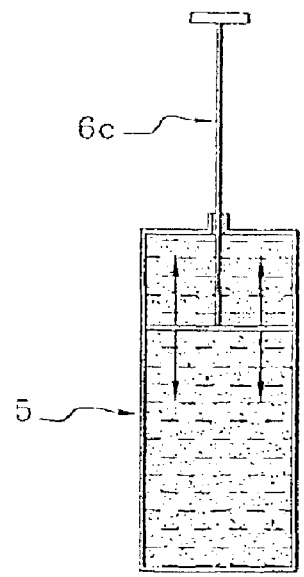

METHOD FOR THE PRODUCING OF A FLOOR COVERING

CROSS REFERENCE TO RELATED APPLICATION

This application is a continuation of International Application PCT/FR01/00559, with an international filing date of Feb. 27, 2001, the entirety of which is incorporated herein by reference.

TECHNICAL FIELD

The present invention relates to an improvement to methods for producing floor coverings from flexible sheet materials.

It relates more precisely to an improved method for producing the join between elementary panels.

PRIOR ART

It was proposed a very long time ago to produce floor coverings from flexible sheets of plastic, in particular plasticized PVC, optionally reinforced by a fabric structure embedded within the mass of the material.

Moreover, to improve comfort, the thermoplastic surface sheet is very often combined with a foam underlay. In addition, the visible face is covered with a top coat giving the whole assembly specific properties such as UV resistance, crush resistance, scratch resistance, wear resistance, abrasion resistance and nonskid properties.

One of the problems that arises with such coverings, which are adhesively bonded to the backing, is that of how to produce the join between two consecutive strips or panels, and how to seal along plinth-like upturned edges.

At the present time, two basic techniques are used to produce the join between elementary edges, namely hot bonding and cold bonding.

The technique called "hot bonding" consists in thermally melting the width edges using a bead of PVC filler material and a hot-air torch.

To do this, chamfers are made along the width edges and a filler material (PVC), that can be melted by means of a hot-air torch, is produced.

Such a procedure makes it possible to obtain a very high strength, of greater than 8 daN/cm, and to bond corners with a rounded profile and vertical parts.

However, the competence of the bonder is of primary importance for obtaining good uniformity of the joint and above all it results in deterioration of the properties of the surface coating with, especially in the case in which the latter is formed by a varnish, a "shriveling" defect that may extend over more than one centimeter of width.

Moreover, when producing a joint, after leveling in order to remove excess material, a slight shrinkage very often occurs, forming a recess at the bonded joint that will cause fouling problems during use.

The technique called "cold bonding" is used to produce a join between widths of foam materials, using a solution of PVC resin in a solvent (for example, tetrahydrofuran) which, after evaporation of said solvent, bonds the foam part and makes the facing surfaces adhere to each other.

The area of contact of two consecutive widths is covered by means of a protective adhesive that is notched using a cutter along the join line.

Having done this, cold bonding material is injected via the bottom of the material using a fine nozzle that is introduced between the two widths.

The excess bonding material is therefore deposited on the protective adhesive, which allows it to be removed without impairing the surface characteristics of the floor covering.

However, the join between two consecutive widths is weaker than in the case of hot bonding, the strength not exceeding 4 daN/cm.

In addition, it is not possible to achieve bonding in corners or in a plinth upturn on account of the low viscosity of the solution which also involves the use of a solvent.

Such a technique therefore involves four successive operations after bonding the covering to the floor and it is difficult to check the uniformity of the bond after formation.

Patent DE 949 261 teaches a method of laying a floor covering of the type consisting of a flexible complex, comprising a wear layer made of a thermoplastic, based on plasticized PVC, the widths constituting said covering being stuck to the floor and cold-bonded together on the site to be furnished.

SUMMARY OF THE INVENTION

A method has now been found, and it is this that forms the subject of the present invention, which is simple to employ and makes it possible to produce a bond between two consecutive widths of a floor covering and to treat the corners and plinth upturns, which bond has a strength of greater than 5 daN/cm and is continuous and constant in value.

Moreover, to produce such a bond is extremely simple and involves no deterioration in the characteristics and properties of the surface coating.

In general, the invention therefore relates to a method of laying a floor covering of the type consisting of a flexible complex, comprising a wear layer made of a thermoplastic, especially based on plasticized PVC, the widths constituting the covering being stuck to the floor and cold-bonded together on the site to be furnished, characterized in that, after laying a width on the surface to be covered and after bonding it thereto:

a continuous bead of mastic, produced by mixing, on the site itself, a hardener and a polyurethane resin in aqueous phase having a viscosity of between 10 000 and 12 000 centipoise (cps), is applied laterally, over the entire thickness of the covering;

the next width is laid on the floor covered with adhesive and its lateral edge is pressed against the edge of the previous width that includes the bead of mastic, causing the expulsion of the excess material onto the surface; and the excess material thus expelled is removed by simple washing with water.

Such a method may be used for any type of floor covering based on plasticized PVC, that may or may not include a surface varnish and may optionally be reinforced by a fabric structure and/or possess a foam-based underlay.

To implement the method according to the invention, and more particularly to apply the bead of mastic, a mastic gun is used that can hold a cartridge containing the hardener and the polyurethane resin and is fitted with a nozzle for applying the mixture of these two elements during the laying operation.

As components making up the composition of the mastic adjoining two widths together, the following will be used:

one part of a hardener based on aliphatic isocyanates; and nine parts of a resin based on an aliphatic polyurethane resin.

The bead of mastic is deposited in an amount of 12± [lacuna] g/m of length of widths to be joined together.

The viscosity of the bead of mastic is between 10 000 and 12 000 centipoise (cps) at 1000 rpm, thereby allowing it to be deposited in a uniform manner, not only horizontally but also for making a vertical bond, for example to produce a plinth upturn.

By proceeding in this way, a perfect sealed joint is obtained between two consecutive widths, without any deterioration in the appearance or the surface properties of the covering.

BRIEF DESCRIPTION OF THE DRAWINGS

The invention and the advantages that it affords will however be more clearly understood thanks to the following description illustrated by the appended diagrams in which:

FIG. 1 is a perspective schematic view showing the laying of the first width of a floor covering in accordance with the invention;

FIGS. 2 and 3 are schematic views showing the cartridge containing the components making up the composition of the mastic (FIG. 2) and the way in which the mixing is carried out (FIG. 3);

DETAILED DESCRIPTION OF THE INVENTION

The invention employed for laying a floor covering, comprising a wear layer having a thickness of 0.7 mm, made of plasticized PVC reinforced with a nonwoven mat combined with a glass mesh, and a surface coating based on a crosslinked polyurethane, consisting of a film giving the material its ultraviolet, abrasion and wear resistance properties.

This complex is combined with a foam underlay. The total thickness is 3.2 mm.

In a first phase of installing such a covering as shown in FIG. 1, a first width (1) is stuck to the floor (S) using an acrylic adhesive in emulsion form, deposited using a spatula.

The plinth-like upturn (2) is also formed by adhesive bonding, an angle piece (3) being provided in the corner.

Figure 4:
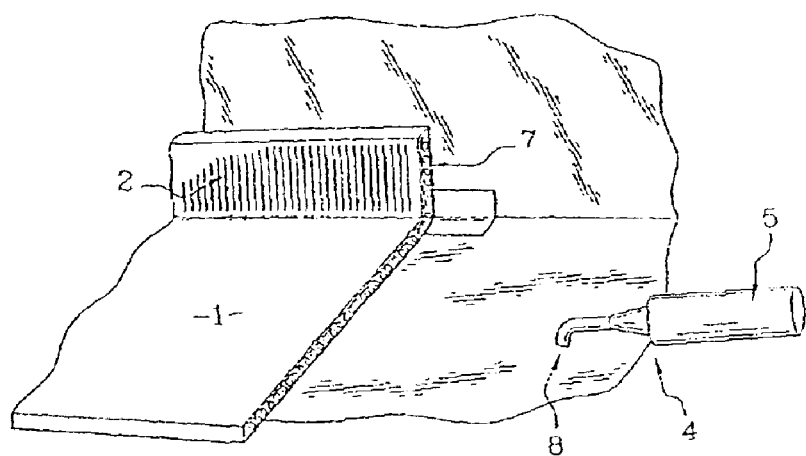
FIG. 4 illustrates the deposition of the bonding bead along the edge of the width thus laid.

Once this first width (1) has been laid, a bead of adhesive (7) is deposited as shown in FIG. 4, using a gun (4) holding a cartridge (5), along the entire length of the width laid.

Refering to FIG. 2, the cartridge (5) contains the hardener (6a), namely an aliphatic isacyanate and the resin (6b), namely an aliphatic polyurethane.

The metering is carried out automatically and the two components (6a, 6b) have mixed in the cartridge (5), for example by manual stirring using a mixing rod (6c) (see FIG. 3).

The bead of adhesive is deposited in an amount of 12±2 g/linear meter.

Figure 5:
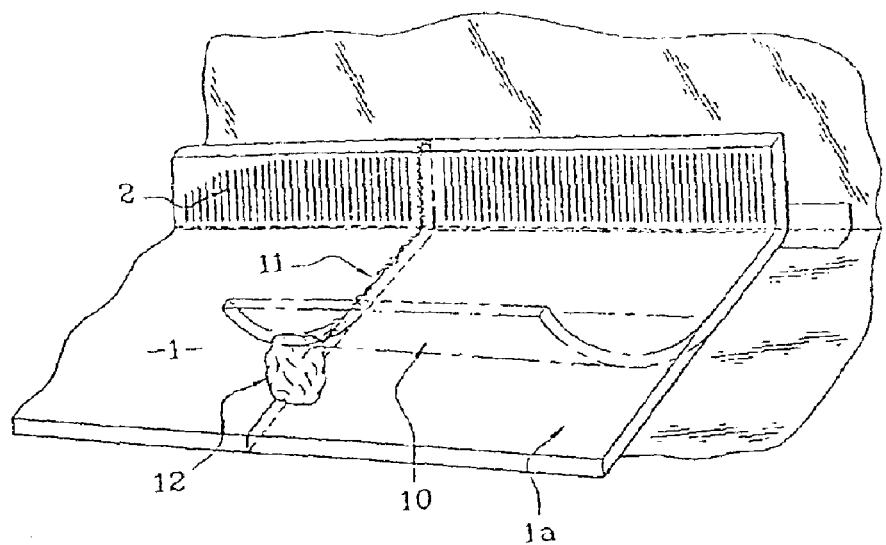
FIG. 5 illustrates the placing of the next width and the removal of excess material.

To install the next, second width (1a) as shown in FIG. 5, acrylic adhesive in emulsion form is also deposited in an amount of 250±50 g/m² on the floor and the upturn.

During laying, care is taken to bend up the width by half (10) as shown in dotted lines FIG. 5.

The positioning is carried out in such a way that when this bent-up part (10) is turned down, it is applied against the face of the edge coated with the bead (7).

With the two widths (1) and (1a) thus placed edge to edge, the excess bonding material rises to the surface (11) and, because of its composition, can be easily removed by simply wiping with a sponge (12).

By proceeding in this way, a perfect joint is obtained between the two widths, the bonding having a strength of between 6.5 and 8.5 daN/cm for a floor covering having a foam underlay as indicated above.

For a standard material that does not include a foam underlay, the strength is between 6 and 6.5 daN/cm.

Moreover, the fact of depositing a bead of adhesive allows the continuity of the bonding to be checked, something which is not the case when this operation is carried out by the blind injection of a solution.

The formulation used also allows easy vertical application.

The bonding operation may be carried out by a moderately skilled operator and the use of a gun with a cartridge having a swiveling application nozzle, which is very simple to use and requires only a mixing operation on the part of the layer.

Moreover, since the mastic is water-based, it eliminates any problems of fume toxicity from hot bonding and the presence of solvents in the case of cold bonding.

Finally, and above all, such a method eliminates any degradation of the surface of the covering and results in bonded joints that remain strong over time and do not become fouled with use.

What is claimed is:

1. A method of laying a floor covering at a site wherein first and second widths constituting said covering are bonded to the floor and cold-bonded together at the site, comprising the steps of:

providing said first and second widths comprised of the type consisting of a flexible complex comprising a wear layer made of a thermoplastic based on plasticized PVC with upturned edges;

laying said first width on a floor surface to be covered and bonding it thereto;

applying a continuous bead of mastic, produced by mixing, at the site itself, a hardener and a polyurethane resin in aqueous phase, over the entire thickness of an edge of said first width;

laying said second width on said floor and pressing it lateral edge against the edge of said first width that includes the bead of mastic, causing the expulsion of excess mastic onto an upper surface of said first width and said second width; and removing the excess mastic by washing with water.

2. The method as claimed in claim 1, characterized in tha the mastic for bonding between two consecutive widths is composed of:

one part of a hardener based on an aliphatic isocyanate; and nine parts of a resin based on an aliphatic polyurethane resin.

3. The method as claimed in claim 2, wherein the viscosity of the mastic is between 10 000 and 12 000 centipoise (cps), the bead being deposited along the edge to be joined in an amount of 12±2 g per meter of length.

4. The method as claimed in claim 1, wherein the viscosity of the mastic is between 10000 and. 12 000 centipoise (cps), the bead being deposited along the edge to be joined in an amount of 12±2 g per meter of length.

5. A method of laying a floor covering at a site of the type consisting of a flexible complex comprising a wear layer made of a thermoplastic based on plasticized PVC, wherein first and second widths constituting said covering are bonded to the floor and cold-bonded together at the site, comprising the steps of:

laying said first width on a floor surface to be covered and bonding it thereto;

applying a continuous bead of mastic, produced by mixing, at the site itself, a hardener and a polyurethane resin in aqueous phase, over the entire thickness of an edge of said first width;

bending said second width upwards in a direction substantially transverse to said thickness of said first width to create a bent portion within said second width and laying an unbent portion of said second width on the surface to be covered and bonding it thereto;

pressing said bent portion of said second width downward such that said bent portion contacts the surface to be covered and a lateral edge of said second width is pressed against the edge of said first width that includes the bead of mastic, causing the expulsion of excess mastic onto an upper surface of said first width and said second width; and removing the excess mastic by washing with water.

6. The method as claimed in claim 5, characterized in that the mastic for bonding between two consecutive widths is composed of:

one part of a hardener based on an aliphatic isacyanate; and nine parts of a resin based on an aliphatic polyurethane resin.

7. The method as claimed in claim 6, wherein the viscosity of the mastic is between 10 000 and 12 000 centipoise (cps), the bead being deposited along the edge to be joined in an amount of 12±2g per meter of length.

8. The method as claimed in claim 5, wherein the viscosity of the mastic is between 10 000 and 12 000 centipoise (cps), the bead being deposited along the edge to be joined in an amount of 12±2 g per meter of length.

* * * * *

UNITED STATES PATENT AND TRADEMARK OFFICE
CERTIFICATE OF CORRECTION

PATENT NO.    : 6,849,143 B2
DATED         : February 1, 2005
INVENTOR(S)   : Alain Rivat and Robert Hinault It is certified that error appears in the above-identified patent and that said Letters Patent is hereby corrected as shown below:

Column 3,
Line 64, please add -- in -- after "lines"

Column 4,
Line 51, please change "tha" to -- that --

Column 6,
Line 7, please change "isacyanate" to -- isocyanate --

Signed and Sealed this

Twenty-sixth Day of April, 2005

JON W. DUDAS
*Director of the United States Patent and Trademark Office*